(12) United States Patent
Tupper

(10) Patent No.: US 7,198,661 B2
(45) Date of Patent: Apr. 3, 2007

(54) GAS PURIFICATION MEDIUM FOR REMOVING SULFIDES FROM GASEOUS STREAMS

(76) Inventor: Lorne Alvin Tupper, 4339-115 Street, Edmonton, Alberta (CA) T6J 1P5

( * ) Notice: Subject to any disclaimer, the term of this patent is extended or adjusted under 35 U.S.C. 154(b) by 238 days.

(21) Appl. No.: 10/872,322

(22) Filed: Jun. 18, 2004

(65) Prior Publication Data

US 2005/0020441 A1  Jan. 27, 2005

(30) Foreign Application Priority Data

Jun. 25, 2003  (CA) .................................. 2433277

(51) Int. Cl.
B01D 53/02 (2006.01)
(52) U.S. Cl. ........................ 96/153; 502/400
(58) Field of Classification Search .................. 96/153; 502/300, 400
See application file for complete search history.

(56) References Cited

U.S. PATENT DOCUMENTS

| | | |
|---|---|---|
| 1,160,375 A | 11/1915 | Burkheiser |
| 1,734,307 A | 11/1929 | Sperr, Jr. |
| 1,849,428 A | 3/1932 | Laux |
| 2,122,236 A | 6/1938 | Nichols et al. |
| 3,117,844 A | 1/1964 | Bureau |
| 3,301,323 A | 1/1967 | Parsons |
| 3,887,474 A | 6/1975 | Senfe et al. |
| 4,049,775 A | 9/1977 | Majewska et al. |
| 4,246,243 A | 1/1981 | Fox |
| 4,246,244 A | 1/1981 | Fox |
| 4,366,131 A | 12/1982 | Fox |
| 4,478,800 A | 10/1984 | van der Wal et al. |
| 4,548,720 A | 10/1985 | Gilligan, III |
| 4,552,750 A | 11/1985 | van der Wal et al. |
| 4,629,612 A | 12/1986 | van der Wal et al. |
| 4,634,539 A | 1/1987 | Fox et al. |
| 4,732,888 A | 3/1988 | Jha et al. |
| 4,832,704 A | 5/1989 | Grindly |
| 4,857,285 A | 8/1989 | Gal |
| 4,900,356 A | 2/1990 | Hoffman |
| 5,026,528 A | 6/1991 | Gal |
| 5,057,473 A | 10/1991 | Voecks et al. |
| 5,118,480 A | 6/1992 | Cook et al. |
| 5,152,970 A | 10/1992 | van der Wal et al. |
| 5,244,641 A | 9/1993 | Khare |
| 5,271,907 A | 12/1993 | Copeland |
| 5,306,685 A | 4/1994 | Khare |
| 5,320,992 A | 6/1994 | Fox et al. |

(Continued)

OTHER PUBLICATIONS

"Direct Oxidation Technology & Process Unveiled for Large-Scale 1 to 50 Ton Per Day Sulfur Removal." Excerpt on SulfaTreat taken from Hydrocarbon Processing Journal, as early as May 17, 2004.

(Continued)

*Primary Examiner*—Robert A. Hopkins
(74) *Attorney, Agent, or Firm*—Christensen O'Connor Johnson Kindness PLLC

(57) ABSTRACT

A gas purification medium for removing sulfides from a gaseous stream which includes tailings containing mixed metal oxides produced from a high pressure hydrometallurgical leaching process of a sulfidic ore for the recovery of at least one of nickel, cobalt, copper or zinc, mixed with a porous carrier medium.

19 Claims, 1 Drawing Sheet

U.S. PATENT DOCUMENTS

| | | | |
|---|---|---|---|
| 5,401,475 A | 3/1995 | Ayala et al. |
| 5,494,880 A | 2/1996 | Siriwardane |
| 5,545,391 A | 8/1996 | Clapp et al. |
| 5,632,931 A | 5/1997 | Fox et al. |
| 5,674,463 A | 10/1997 | Dao et al. |
| 5,703,003 A | 12/1997 | Siriwardane |
| 5,711,922 A * | 1/1998 | O'Brien et al. ............. 423/106 |
| 5,714,431 A | 2/1998 | Gupta et al. |
| 5,792,438 A | 8/1998 | Scranton, Jr. |
| 5,866,503 A | 2/1999 | Siriwardane |
| 5,935,420 A * | 8/1999 | Baird et al. ................. 208/213 |
| 5,935,547 A | 8/1999 | LeComte et al. |
| 5,948,269 A | 9/1999 | Stone |
| 5,951,961 A | 9/1999 | Viltard et al. |
| 5,958,830 A | 9/1999 | Khare et al. |
| 5,968,347 A | 10/1999 | Kolodziej et al. |
| 6,063,357 A | 5/2000 | Boucot et al. |
| 6,099,819 A | 8/2000 | Srinivas et al. |
| 6,126,911 A | 10/2000 | Scranton, Jr. |
| 6,210,454 B1 | 4/2001 | Viltard et al. |
| 6,228,802 B1 | 5/2001 | Scranton, Jr. et al. |
| 6,251,348 B1 | 6/2001 | Scranton, Jr. |
| 6,306,793 B1 | 10/2001 | Turk et al. |
| 6,309,609 B1 | 10/2001 | Lecomte et al. |
| 6,346,190 B1 | 2/2002 | Khare |
| 6,350,422 B1 | 2/2002 | Khare et al. |
| 6,351,961 B1 | 3/2002 | Kurokawa et al. |
| 6,365,053 B1 | 4/2002 | Sunde et al. |
| 6,413,488 B1 | 7/2002 | Smith et al. |
| 6,500,237 B2 | 12/2002 | Winchester et al. |

OTHER PUBLICATIONS

SulfaTreat XLP, Product Bulletin, as early as Dec. 31, 2002.
Sulf Treat, available at http://www.sulfatreat.com/whatis.html, as early as Apr. 21, 2003.
Gastec technology BV, "Selox—desulphurisation of biogas, landfill gas and sour natural gas", Technical Brochure, Dec. 2001.
Boldt, Jr., Joseph R. "The Winning of Nickel: It's Geology, Mining, and Extractive Metallurgy", pp. 7, 69, 222, 301, 303-305, 439, 449, Toronto:Logmans Canada Limited, 1967.

* cited by examiner

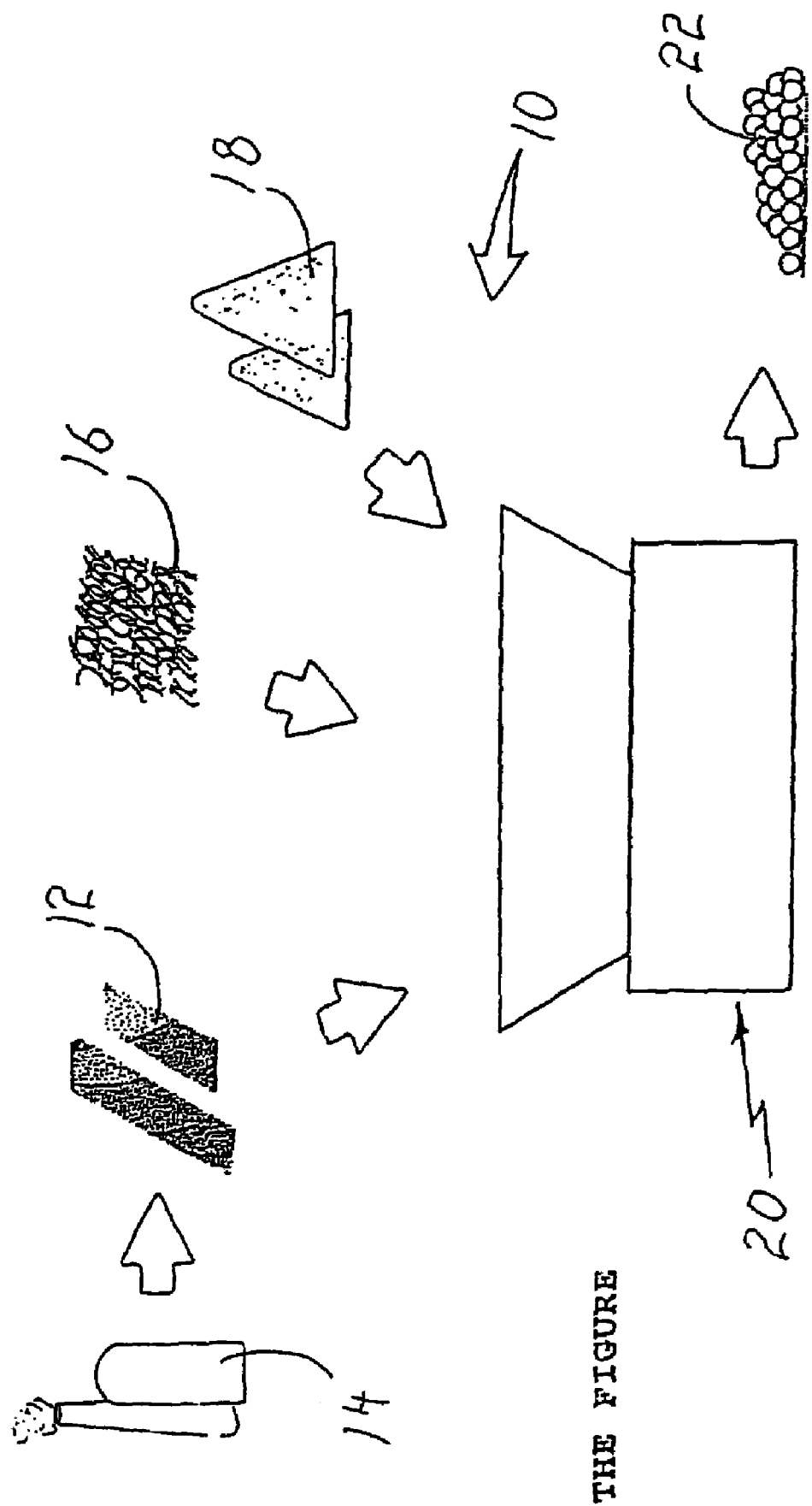
THE FIGURE

GAS PURIFICATION MEDIUM FOR REMOVING SULFIDES FROM GASEOUS STREAMS

FIELD OF THE INVENTION

The present invention relates to a gas purification medium used to remove sulfides, such as hydrogen sulfide, mercaptans, and carbonyl sulfide, from gaseous streams and, in particular, natural gas, air and emissions from combustion.

BACKGROUND OF THE INVENTION

U.S. Pat. No. 4,246,243 (Fox 1981) entitled "Use of steel plant waste dusts for scavenging hydrogen sulfide", describes a process for scavenging hydrogen sulfide gas from drilling mud. Iron rich dusts created during basic oxygen and open hearth steel making processes were identified as being particularly useful in hydrogen sulfide scavenging in a liquid medium.

U.S. Pat. No. 4,366,131 (Fox 1982) entitled "Highly reactive iron oxide agents and apparatus for hydrogen sulfide scavenging", describes a gas purification medium for use in a cartridge type device which consists of substantially dry iron oxide particles intermixed with inert particulate matter, such as sand.

An example of a gas purification medium for removing sulfides from natural gas, is sold under the Trade Mark "SulfaTreat" by a division of the Smith/Schlumberger Company.

SUMMARY OF THE INVENTION

The present invention relates to a gas purification medium for removing sulfides from gaseous streams.

According to the present there is provided a gas purification medium for removing sulfides from gaseous streams. The gas purification medium includes tailings containing mixed metal oxides produced from a high pressure hydrometallurgical leaching process of a sulfidic ore for the recovery of at least one of nickel, cobalt, copper or zinc which are mixed with a porous carrier medium.

The gas purification medium, as described above, has been found to be approximately twice as effective as SulfaTreat. It has also been found to have an improved ability to be rejuvenated. Research is on-going to determine the reason for such a dramatic improvement in the performance. It is believed that the presence of trace metals in the tailings provides catalytic enhancement and improved gas scavenging ability. It is also believed that there are also present in the tailings, sulphur salt species, such as ammonium sulphate, which contribute to this improved gas scavenging ability.

Although beneficial results may be obtained through the use of the gas purification medium, as described above, the best porous carrier medium which has been tried to date has been peat moss. Alternative porous carrier mediums include activated carbon, char, compost, vermiculite, and diatomageous earth.

Although beneficial results may be obtained through the use of the gas purification medium, as described above, it is preferred that the tailings and porous carrier medium be formed into pellets. The pellets are porous and accommodate gas flow both through and between them. Pelletizing the tailings also makes a high surface area available for reaction with the flowing gas.

Although beneficial results may be obtained through the use of the gas purification medium, as described above, in making the pellets, binders have been used to increase the compressive strength of the pellets. Experiments are being conducted to determine whether the binders are necessary. Initial results appear to indicate that beneficial results may be obtainable without the use of binders.

Although beneficial results may be obtained through the use of the gas purification medium, as described above, the binder of choice is sodium carbonate. Sodium carbonate has provided good compressive strength while also serving as a pH controller.

BRIEF DESCRIPTION OF THE DRAWINGS

These and other features of the invention will become more apparent from the following description in which reference is made to the appended drawing, the drawing is for the purpose of illustration only and is not intended to in any way limit the scope of the invention to the particular embodiment or embodiments shown, wherein:

The FIGURE is a flow diagram illustrating the manufacture of gas purification medium for removing sulfides from gaseous streams in accordance with the teachings of the present invention.

DETAILED DESCRIPTION OF THE PREFERRED EMBODIMENT

The preferred embodiment, a gas purification medium for removing sulfides from gaseous streams and method of manufacture generally identified by reference numeral 10, will now be described with reference to THE FIGURE.

Composition:

Tailings 12, produced from a high pressure hydrometallurgical leaching process of sulfidic ore 14 are provided. Peat moss 16 is used as a porous carrier medium and sodium carbonate 18 is used as a binder. Tailings 12, peat moss 16 and sodium carbonate 18 are combined in a pelletizing process 20 to produce pellets 22. The peat moss is pre-sieved with a graduation suitable for disc pelletizing. It is air dried at room temperature until an equilibrium is reached. A disk pelletizer is used capable of creating pellets of a size distribution to maximize bulk, absolute and envelope densities using dry air circulation to produce pellets of sufficient compressive strength. The use of a binder increases the compressive strength of the pellets to withstand bed depths capable of scavenging all the sulfides without collapsing. This is necessary to prevent back pressure within the reactor.

The proportions of ingredients are not less than 40% by volume of tailings and not more than 60% by volume of tailings. If the volume of tailing is less than 40%, one cannot be certain that there is enough reactive material to scrub the sulfides from the gas stream. If the volume of tailings is greater than 60%, then there is a danger that the porosity of the scrubbing medium becomes affected. The balance of the formulation consists of a porous carrier medium. Of the various porous carrier mediums tried, peat moss appears to be the most suitable. Optionally, up to 10% by volume can be made up of sodium carbonate. Sodium carbonate serves both as a suitable binder and a pH controller. It also serves to stabilize ferric sulfide hydrate at temperatures up to 40 degrees celcius.

Use of Composition:

The gaseous stream being processed should be kept as free as possible of any liquids or solids prior to scrubbing. For maximum performance, the gaseous stream to be scrubbed should be saturated. Ideally the temperatures should be kept between 10 and 25 degrees celcius. In any event, the temperature should not exceed 40 degrees celcius. The medium should be kept weakly alkaline. The addition of 1% oxygen to the gaseous stream will at least double the life of the medium charge. Spent medium can be used to scrub out any excess oxygen, which may occur during the absorption/reduction cycle.

The use of tailings 12 from a high pressure hydrometallurgical leaching process of a sulfidic ore 14 for the recovery of at least one of nickel, cobalt, copper or zinc ensures a dramatically improved gas scavenging ability when used as a medium. The presence of trace metals and sulphur salt species from hydrometallurgical process 14 contribute to this improvement. By pelletizing 20 the tailing 12 with peat moss 16 and sodium carbonate 18, a porous medium with a high surface area can accommodate greater gas flow both through and between the pellets 22. Sodium carbonate 18 contributes a good compressive strength to the medium 10, serves as a pH controller and serves to stabilize ferric sulfide hydrate.

The following can be said about the gas scrubbing medium, as described above:
1) it acts as a catalyst when used with oxygen in a gaseous stream;
2) it is capable of scavenging 100% of the hydrogen sulfides in the gaseous stream;
3) it takes out mercaptans equally well;
4) it can be regenerated and reused up to 9 times without loss of activity;
5) it works in a low temperature process at temperatures of less than 40 degrees celcius;
6) it's capacity in terms of sulphur removed when mixed with peat moss is between 1.3 and 1.6 grams of sulphur for each gram of bed;
7) pressure drop across the medium bed is negligible;
8) scavenging performance is independent of pressure;
9) performance is not affected by the presence of carbon dioxide in the gaseous stream;
10) large amounts of liquid water is to be avoided, so as not to soften the pellets;
11) When peat moss is used as the porous carrier medium, not only can one make use of the surface area and pore porosity of the iron oxide itself, but there is a tremendous gain in void capacity for elemental sulphur from the fiberous structure of the peat moss;
12) because ammonia is used in the leaching process, there is ammonium sulfate residue in the tailings, which is believed to enhance the scavenging process by promoting the formation of hydrated oxides;
13) oxides are present in the tailings in various forms: iron oxide, sulphur oxide, cobalt-iron oxide, and nickel-iron oxide. All iron oxides are believed to be active in the scavenging process.

| Sample formulation: | |
| --- | --- |
| Tailings | 47.6 percent by volume |
| Peat Moss | 47.6 percent by volume |
| Sodium Carbonate | 4.8 percent by volume |
| | 100.0 |

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A gas purification medium for removing sulfides from a gaseous stream, comprising:
    tailings containing mixed metal oxides produced from a high pressure hydrometallurgical leaching process of a sulfidic ore for the recovery of at least one of nickel, cobalt, copper or zinc; and
    peat moss as a porous carrier medium.

2. The gas purification medium as defined in claim 1, wherein the tailings contain sulphur salt species.

3. The gas purification medium as defined in claim 2, wherein the sulphur salt species is ammonium sulfate.

4. The gas purification medium as defined in claim 1, wherein there is not less than 40% tailings by volume and not more than 60% tailings by volume.

5. The gas purification medium as defined in claim 1, wherein the tailings and porous carrier medium are formed into pellets.

6. The gas purification medium as defined in claim 5, wherein a binder is added to increase the compressive strength of the pellets.

7. The gas purification medium as defined in claim 6, wherein the binder is sodium carbonate, the sodium carbonate also serving as a pH controller.

8. A gas purification medium for removing sulfide from a gaseous stream, comprising:
    pellets formed from:
        tailings containing mixed metal oxides produced from a high pressure hydrometallurgical leaching process of a sulfidic ore for the recovery of at least one of nickel, cobalt, copper or zinc, the tailings containing sulphur salt species;
        peat moss as a porous carrier medium; and
        sodium carbonate as a binder to increase the compressive strength of the pellets and as a pH controller;
    the pellets having not less than 40% tailings and not more than 60% tailings by volume.

9. A gas purification medium for removing sulfides from a gaseous stream, comprising:
    tailings containing mixed metal oxides produced from a high pressure hydrometallurgical leaching process of a sulfidic ore for the recovery of at least one of nickel, cobalt, copper or zinc; and
    a porous carrier medium, the tailings and porous carrier medium being formed into pellets with sodium carbonate being added as a binder to increase the compressive strength of the pellets, the sodium carbonate also serving as a pH controller.

10. The gas purification medium as defined in claim 9, wherein the tailings contain sulphur salt species.

11. The gas purification medium as defined in claim 10, wherein the sulphur salt species is ammonium sulfate.

12. The gas purification medium as defined in claim 9, wherein the porous carrier medium is peat moss.

13. A gas purification medium for removing sulfides from a gaseous stream, comprising:
    tailings containing mixed metal oxides produced from a high pressure hydrometallurgical leaching process of a sulfidic ore for the recovery of at least one of nickel, cobalt, copper or zinc, there being not less than 40% tailings by volume and not more than 60% tailings by volume; and a porous carrier medium.

14. The gas purification medium as defined in claim 13, wherein the tailings contain sulphur salt species.

15. The gas purification medium as defined in claim 14, wherein the sulphur salt species is ammonium sulfate.

16. The gas purification medium as defined in claim 13, wherein the porous carrier medium is peat moss.

17. The gas purification medium as defined in claim 13, wherein the tailings and porous carrier medium are formed into pellets.

18. The gas purification medium as defined in claim 17, wherein a binder is added to increase the compressive strength of the pellets.

19. The gas purification medium as defined in claim 18, wherein the binder is sodium carbonate, the sodium carbonate also serving as a pH controller.

* * * * *